(12) United States Patent
Anderson

(10) Patent No.: US 6,980,081 B2
(45) Date of Patent: Dec. 27, 2005

(54) SYSTEM AND METHOD FOR USER AUTHENTICATION

(75) Inventor: James Anderson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 360 days.

(21) Appl. No.: 10/143,661

(22) Filed: May 10, 2002

(65) Prior Publication Data

US 2003/0210127 A1 Nov. 13, 2003

(51) Int. Cl.[7] .......................... G05B 19/00; G06F 7/00; G06K 9/00; G06T 1/00; H04B 1/00
(52) U.S. Cl. .................. 340/5.53; 340/5.51; 340/5.54; 340/5.6; 340/5.7; 340/5.8
(58) Field of Search ............................ 340/5.51, 5.53, 340/5.54, 5.7, 5.8, 5.81, 5.86, 5.27, 5.21, 340/5.2; 434/236, 219, 79; 382/118; 713/184, 713/202

(56) References Cited

U.S. PATENT DOCUMENTS

| | | | |
|---|---|---|---|
| 4,184,148 A * | 1/1980 | Smagala-Romanoff | 340/5.54 |
| 5,177,789 A * | 1/1993 | Covert | 713/184 |
| 5,251,259 A * | 10/1993 | Mosley | 713/184 |
| 5,276,314 A * | 1/1994 | Martino et al. | 340/5.27 |
| 5,608,387 A | 3/1997 | Davies | 340/825.34 |
| 5,712,627 A * | 1/1998 | Watts | 340/5.81 |
| 5,815,083 A * | 9/1998 | Patarin et al. | 340/5.27 |
| 5,928,364 A * | 7/1999 | Yamamoto | 713/202 |
| 6,209,104 B1 * | 3/2001 | Jalili | 713/202 |
| 6,571,336 B1 * | 5/2003 | Smith, Jr. | 713/184 |
| 6,720,860 B1 * | 4/2004 | Narayanaswami | 340/5.54 |

* cited by examiner

Primary Examiner—Michael Horabik
Assistant Examiner—Nam Nguyen

(57) ABSTRACT

According to one embodiment of the present invention, a method for authenticating a user of a device comprises: generating at least one arrangement comprising a sub-set of a plurality of stored objects, the sub-set comprising at least one authenticating object that forms at least part of a user's authentication key and the sub-set further comprising at least one non-authenticating object, wherein such generating comprises randomly selecting a position within the at least one arrangement for the at least one authenticating object and randomly selecting the at least one non-authenticating object from the plurality of stored objects; presenting to a user the generated at least one arrangement; receiving input that comprises a selection of at least one of the objects from the at least one arrangement; and determining whether the selection identifies the authentication key.

38 Claims, 5 Drawing Sheets

USER AUTHENTICATION KEY = ♠, ♥, ♦

SYSTEM AND METHOD FOR USER AUTHENTICATION

FIELD OF THE INVENTION

The present invention relates in general to systems and methods for authenticating a user.

BACKGROUND OF THE INVENTION

Many systems and applications are intended to be accessible only by certain authorized user(s). Accordingly, such systems and applications commonly implement some means of authenticating a user requesting access thereto as being a user that is authorized for such access. Techniques for authenticating a user have a wide range of application in the existing art. For example, user-authentication techniques may be utilized for authenticating a user before granting the user access to a particular physical location (e.g., a user-authenticating system implemented for a door). As another example, user-authentication techniques may be utilized for authenticating a user before granting the user access to all or a portion of the functionality (e.g., applications) available on a computer system.

For instance, automated teller machines (ATMs) commonly implement an application that provides a user interface for receiving a personal identification number (PIN) from a user requesting access thereto. Only if the user provides the proper PIN for a particular account(s) for which the user is requesting access does the ATM allow the user access to such account(s). Many other systems and applications in which user access is restricted implement user interfaces that require a proper PIN (or other type of password) for access or implement similar types of user-authentication techniques in which the user is required to input certain information to the system that authenticates the user as one that is to be allowed access thereto.

Various types of user interfaces and techniques for receiving user-authenticating information have been developed in the existing art. For example, certain techniques utilize physical user-authentication devices, such as encoded cards, instead of or in addition to requiring that a user input information such as a PIN, password, etc. For instance, a door may include a card reader associated therewith such that only if a valid card that is properly encoded is swiped through the card reader is a user granted access through the door. Thus, those users possessing cards that are encoded for access to the physical area beyond the door may be allowed such access through the door, while users not possessing such cards are not allowed access through the door. In another technique, a door may have a security system with a keypad associated therewith in which a user is to input a PIN, and if the PIN input to the security system via the keypad is assigned a security level that authorizes the user access through the door, it opens; otherwise, the door denies access.

Techniques for user authentication are becoming increasingly important for mobile devices, such as mobile telephones (e.g., cellular telephones) and personal digital assistants (PDAs), as examples. Many users utilize one or more mobile devices, and the number of users of mobile devices is expected to increase as new mobile devices are developed that are more economical and/or offer increased functionality. It is important for a user authentication technique to be available for a mobile device for several reasons. As one example, the very nature of mobile devices increases the possibility that such devices may fall into the hands of an unauthorized user. For instance, the mobility of mobile devices increases the potential for the devices to be misplaced by a user or to be stolen by an unauthorized user.

Further, many mobile devices offer the ability for communication. For example, devices, such as hybrid cellular telephones are available, that can be used for both data (e.g., fax, e-mail, and short-text messaging) and voice communication. Unauthorized access to a mobile communication device that allows for communication may be particularly damaging to an authorized user (e.g., such as the owner of the mobile device). For example, the authorized user may incur charges associated with communication, such as long-distance telephone calls, placed by an unauthorized user. Additionally, an unauthorized user may send communication that appears to the recipient to have been sent by the authorized user, which may place the authorized user in an embarrassing situation. For instance, an unauthorized user may send an email message to one or more recipients that appears to the recipients to have been sent by the authorized user of the mobile device. Further, an unauthorized user may receive communication on the mobile device that such user is not authorized to receive. For instance, an unauthorized user may view confidential emails, faxes, etc., received by the mobile communication device that are intended only for the authorized user.

As another example, users often store personal and/or confidential information on mobile devices that may be damaging to the user (or others) if obtained by an unauthorized user. For instance, users often store telephone numbers, addresses, and other personal information about the user's friends and relatives on a mobile device. Additionally, users may store information about the user's finances, such as the user's bank account balance, account number, PIN number, etc., which if accessed by an unauthorized user may be damaging to the user.

In view of the above, it is particularly important to provide a means for authenticating a user of a mobile device to guard against unauthorized use thereof. However, mobile devices often have relatively limited resources available in implementing a user-authenticating technique. For example, mobile devices often comprise relatively less data storage (e.g., memory) and/or processing power than larger computing systems. Further, user input and output is often relatively limited. For instance, many mobile devices comprise relatively small displays, which may be capable of displaying only a few lines of text, for example. Further, the resolution of such displays is typically more limited than that of larger systems. And, many mobile devices comprise a relatively limited input method, such as a touch-screen keyboard displayed on the device's relatively small display.

SUMMARY OF THE INVENTION

According to one embodiment of the present invention, a method for authenticating a user of a device comprises: generating at least one arrangement comprising a sub-set of a plurality of stored objects, the sub-set comprising at least one authenticating object that forms at least part of a user's authentication key and the sub-set further comprising at least one non-authenticating object, wherein such generating comprises randomly selecting a position within the at least one arrangement for the at least one authenticating object and randomly selecting the at least one non-authenticating object from the plurality of stored objects; presenting to a user the generated at least one arrangement; receiving input that comprises a selection of at least one of the objects from the at least one arrangement; and determining whether the selection identifies the authentication key.

BRIEF DESCRIPTION OF THE DRAWINGS

FIG. 4 shows an illustration of exemplary data store that has stored thereto a plurality of objects from which at least one object may be selected for assignment as an authentication key for a user in accordance with embodiments of the present invention;

FIG. 5 illustrates an exemplary authenticating key that may be assigned to a user in accordance with embodiments of the present invention;

FIG. 6 shows an exemplary arrangement of objects selected from a data store of objects, wherein the arrangement includes authenticating and non-authenticating objects;

FIG. 7 shows an example of a plurality of arrangements that each comprise an authenticating object and non-authenticating objects;

FIG. 8 shows another example of a plurality of arrangements that each comprise an authenticating object and non-authenticating objects;

DETAILED DESCRIPTION OF THE INVENTION

Figures 1, 2, 3:
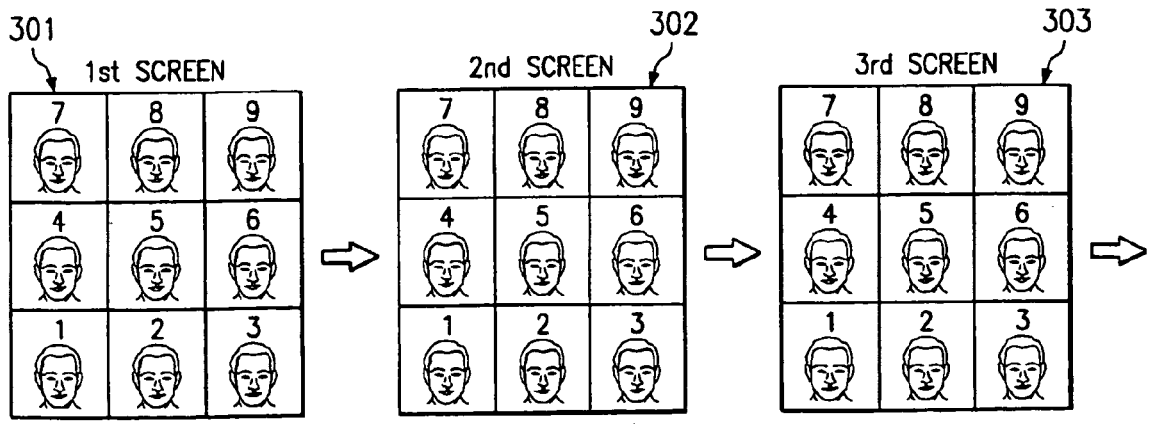
FIG. 1 shows an illustration of exemplary simplified keyboard of the existing art that may be utilized to input an authenticating key assigned to a user.
FIG. 2 shows a diagram of an exemplary key pad of the existing art that may be utilized to input an authenticating key assigned to a user.
FIG. 3 illustrates a further user authentication technique of the existing art, such as is more fully disclosed in U.S. Pat. No. 5,608,387.

Various embodiments of the present invention are now described with reference to the above figures, wherein like reference numerals represent like parts throughout the several views. Embodiments of the present invention enable user authentication. Such user authentication may, for example, be utilized to restrict user access to all or a portion (e.g., certain applications or other resources) of a device, such as a computing device and/or communication device, or location. A preferred embodiment of the present invention is particularly suited for user authentication for a mobile device, such as a mobile computing and/or communication device. Examples of such a mobile device include, but are not limited to, PDAs, mobile telephones (e.g., cellular telephones), and pagers. However, the present invention is not intended to be limited solely to mobile devices, but may, in alternative embodiments, be implemented to enable user authentication for any type of device, including relatively fixed devices, such as personal computers (PCs). Further, embodiments of the present invention may be implemented to enable user authentication for a physical location. For instance, embodiments of the present invention may be implemented in conjunction with a door for restricting access to areas beyond the door to authenticated, authorized users.

According to one embodiment of the present invention, a relatively large data store (e.g., one or more databases) of objects is provided from which an authenticating key for an authorized user of a device (or location) may be selected. In one implementation, the objects from which an authenticating key may be selected include objects that are utilized for other functionality on the device. For instance, the authenticating key may include alphanumeric characters that are not only utilized for authentication of a user, but are also utilized for input/output of such alphanumeric characters in other applications that may execute on the device. As another example, the authenticating key may include images that are used as icons associated with other applications. Accordingly, in such embodiment, the user authentication system requires no additional storage resources for storing objects that are utilized only for user authentication, as the objects used for such user authentication are objects that are stored to the device for other purposes as well (e.g., for use with applications other than the user authentication application).

In one embodiment, a particular authenticating key, which comprises one or more objects selected from the data store of objects, is assigned to a particular user. In certain embodiments, authenticating keys may be assigned to a plurality of different users to enable use of a device by the plurality of different users. Of course, the specific access rights granted to each user may vary. For instance, certain users may be granted access rights to all resources and functionality of a device, while other users may be granted limited access rights to only a portion of the resources and functionality of a device. Techniques for assigning the amount of access rights to be granted to a user are well-known in the art. Whatever a user's particular access rights, embodiments of the present invention may be utilized to authenticate a user in order to have some assurance that the user requesting access to all or a portion of the device is indeed an authorized user of the device. Of course, as described above, in certain embodiments, the user may be authenticated, but may nonetheless be denied access to a portion of the device, as the user may not have unlimited access rights. Thus, the user authentication process provides some assurance that the user is indeed the user with whom the authenticating key is associated, and the access rights granted to such user may allow for full or only partial access to a device (or physical location).

In one embodiment of the present invention, during the user authentication process an arrangement of objects are presented to the user. As one example, the arrangement may comprise a matrix of objects, such as a 3 by 3 matrix of objects, that is displayed to the user. Of course, in other implementations, other arrangements of objects may be generated, such as a 1 by 5 matrix of objects, for example. Any arrangement that comprises at least one authenticating object (i.e., an object that forms at least part of a user's authenticating key) and at least one non-authenticating object may be utilized in embodiments of the present invention. Preferably, when utilized with a mobile device that has a relatively limited display, a suitably small arrangement is utilized for presentation on such display (e.g., a 3×3 matrix, 1×5 matrix, etc.). While the specific examples of a 3 by 3 matrix and a 1 by 5 matrix have been provided above, it should be understood that arrangements of objects in accordance with embodiments of the present invention are not intended to be so limited, but rather arrangements of objects in accordance with embodiments of the present invention may comprise a matrix of any suitable size for presentation to a user (e.g., a matrix having a size larger than 3 by 3 or a matrix having a size smaller than 1 by 5).

In certain implementations, the arrangement may comprise a plurality of matrices that are presented on a plurality of different screens (e.g., with one object of the authenticating key being included within each matrix). The arrangement preferably includes the objects that comprise the user's authenticating key and one or more other objects (referred to herein as "non-authenticating objects"). As described in greater detail below, the object(s) that comprise the user's authenticating key (which may each be referred to herein as "authenticating objects") may be randomly positioned within the arrangement. Further, the arrangement of objects preferably does not include all objects of the data store, but instead such arrangement is preferably a much smaller set of objects selected from the data store. In one embodiment, the non-authenticating objects included in the arrangement are randomly-selected from the data store of objects.

In a preferred embodiment, the generated arrangement of objects, which includes the authenticating object(s) that form the user's authenticating key and non-authenticating objects, is presented to the user, and the user selects object(s) from such arrangement. For example, a user may input a selection of one or more objects by clicking on such objects presented (via a mouse, trackball, stylus, or other pointing device) or by inputting a character (e.g., letter or number) associated with each selected object presented in the arrangement. A determination is then made whether the selected object(s) from the arrangement correspond to the authenticating object(s) that form the user's authenticating key. If the selected object(s) do not correspond to those of the user's authenticating key, the user is not authenticated and is therefore denied access to all or a portion of the device. Of course, in certain implementations the user may be given multiple chances to input a selection of object(s) in attempt to be authenticated. If the selected object(s) do correspond to those of the user's authenticating key, the user is granted the appropriate level of access to the device in accordance with his/her access rights.

Various user authentication techniques and user interfaces for such authentication techniques are available in the existing art. To better understand some of the advantages offered by the present invention, examples of user authentication techniques available in the existing art are described in greater detail hereafter in conjunction with FIGS. 1–3. Turning first to FIG. 1, an illustration of an exemplary simplified keyboard 100 is shown that may **be utilized to input an authenticating key assigned to a user, such as a PIN or password. For example, a user may be assigned a password of "PWD1", and the user authentication program associated with a device may prompt a user to input his/her password. The user may utilize keyboard 100 to input "PWD1" in order to be authenticated. It should be understood that keyboard 100 may be a physical keypad on or communicatively coupled to a device or it may be a keyboard presented on a display (e.g., a touch-screen display) of a device. As is well-known, the characters of keyboard 100 are not randomly generated, but are instead static characters that are consistently presented in the same arrangement. Thus, in the above example, the characters "PWD1" of the user's password are always located in the exact same position within the layout of keyboard 100. Further, the non-authenticating objects are always the same and are always located in the same position within the layout of keyboard 100.

FIG. 2 shows a diagram of an exemplary key pad 200 that may be utilized to input an authenticating key assigned to a user, such as a PIN. For example, a user may be assigned a PIN of "123", and the user authentication program associated with a device may prompt a user to input his/her PIN. The user may utilize key pad 200 to input "123" in order to be authenticated. As with keyboard 100 of FIG. 1, key pad 200 may be a physical key pad on or communicatively coupled to a device or it may be a key pad presented on a display (e.g., a touch-screen display) of a device. Key pad 200 provides a reduced set of characters, which may thereby allow for key pad 200 to consume less space on a device than required for keyboard 100 of FIG. 1. For instance, key pad 200 may consume less area of a display on which it is presented than keyboard 100 consumes. Alternatively, key pad 200 may provide larger input keys than provided on keyboard 100, in which case key pad 200 may consume substantially the same area as keyboard 100 (or even more) but may improve the user-friendliness of such key pad (e.g., may improve the ease of a user selecting each key). Also like keyboard 100 of FIG. 1, the characters of key pad 200 are not randomly generated, but are instead static characters that are consistently presented in the same arrangement. Thus, in the above example, the characters "123" of the user's password are always located in the exact same position within the layout of key pad 200. Further, the non-authenticating objects are always the same and are always located in the same position within the layout of key pad 200

In view of the above, many user authentication techniques of the existing art utilize static user interfaces for receiving a selection of a user's authentication key. More specifically, the objects forming the user's authentication key are typically not randomly positioned within the interface (e.g., keyboard or key pad). As such, a casual observer may be capable of determining a user's authentication key by recognizing the positions selected on the interface. For instance, a casual observer may be capable of recognizing that the user selects an object in the upper right hand portion of the interface, then an object in the center portion of the interface, and then an object in the lower right hand portion of the interface. Because the objects of a user's authenticating key are consistently presented in the same position of the interface, an observer's recognition of the portion(s) of the interface in which the objects are located may prove useful to the observer in later attempting to decipher the user's authenticating key. Further, the non-authenticating objects remain the same and are positioned the same in the user interface for each user authentication attempt. As such, a casual observer may recognize certain objects that are not selected by a user during the authentication process and may therefore eliminate the non-selected objects in later attempting to decipher the user's authenticating key.

FIG. 3 illustrates a further user authentication technique of the existing art, such as is more fully disclosed in U.S. Pat. No. 5,608,387 issued to Davies (hereinafter the "'387 patent"). The '387 patent discloses a user authentication technique in which complex images, such as human faces, are assigned to a user as an authenticating key. The '387 patent defines a complex image as one that is recognizable if already known but not readily capable of unique description to a person to whom it is not known. The preferred example of such a complex image in the '387 patent is a human face. Thereafter, to authenticate a user, a series of screens may be presented to the user wherein each screen includes one complex image that is part of the user's authenticating key and a plurality of false complex images that are not part of the user's authenticating key. For instance, in the example of FIG. 3, a first screen 301 may present a 3 by 3 matrix that comprises 9 human faces with one of the 9 faces being a face that is assigned to a user as part of the user's authenticating key (face number 3 in this example). The '387 patent teaches that the human face that is part of the user's authenticating key may be randomly positioned within the 3 by 3 matrix of screen 301. A user selects one of the 9 human faces by inputting the number associated with the selected face, and a second screen 302 is presented to the user.

The second screen 302 presents another 3 by 3 matrix of human faces with one of the 9 faces presented therein being a face that is assigned to a user as part of the user's authenticating key (face number 6 in this example). The '387 patent teaches that the human face that is part of the user's authenticating key may be randomly positioned within the 3 by 3 matrix of screen 302. The user selects one of the 9 human faces of screen 302 by inputting the number associated with the selected face, and a third screen 303 is presented to the user.

The third screen 303 presents another 3 by 3 matrix of human faces with one of the 9 faces presented therein being a face that is assigned to a user as part of the user's authenticating key (face number 9 in this example). The '387 patent teaches that the human face that is part of the user's authenticating key may be randomly positioned within the 3 by 3 matrix of screen 303. The user selects one of the 9 human faces of screen 303 by inputting the number associated with the selected face. If the human faces selected by the user on each of screens 301, 302, and 303 correspond to the human faces that form the user's authenticating key, then the user is granted access, otherwise the user is not authenticated and access is denied.

As described above, the '387 patent teaches that the human face that is part of the user's authenticating key may be randomly positioned within the matrix of faces on each screen. Thus, recognition by a casual observer of the position of the interface selected by the user for each authenticating object is not helpful to the observer in later attempting to decipher the user's authenticating key. However, the '387 patent fails to disclose a user authentication system in which the non-authenticating objects (or "false images") are randomly-selected from a larger data store of objects than those presented.

The '387 patent discloses a user authentication system that presents a 3 by 3 matrix of faces that comprises one authenticating face and eight false faces (i.e., non-authenticating faces) with the one authenticating face being randomly positioned within the matrix. Thus, the same set of false faces may be presented upon each authentication of a user. Further, the '387 patent discloses that the false faces may be selected by the system for display with reference to their similarity to the user's authenticating faces (e.g., in sex, age, skin color, hair type, etc.) according to the degree of difficulty of selection that may be required. Also, the '387 patent discloses that the false faces may not be faces of real people but may instead be computer-generated images of human faces.

As described in greater detail below, certain embodiments of the present invention utilize a random selection of non-authenticating objects from a data store to be included in the arrangement of objects presented to a user during each user-authentication session. Thus, recognition by a casual observer of certain non-authenticating objects that are not selected by a user during a given session may not be helpful to the observer in later attempting to decipher the user's authenticating key. That is, being able to eliminate certain non-authenticating objects may be of no help in a later session because the non-authenticating objects may not be the same (e.g., the objects known to the observer to be non-authenticating objects may not be presented in a later authentication session).

As also described above, the '387 patent discloses a user authentication system that utilizes complex images. The use of such complex images is important to the user authentication system of the '387 patent because it provides an authentication key that is recognizable to a user but is not easily transferred to others (because such a complex image is not capable of unique description to a person to whom it is not known). As described further below, certain embodiments of the present invention utilize objects that are not "complex" as defined by the '387 patent. Such non-complex objects may, for example, comprise objects that are also utilized for other purposes within the device (e.g., used by applications other than the user authentication application), thus enabling a user-authentication system that does not require further storage resources for storing additional objects for the user-authentication system. Such efficient utilization of system resources may be desirable in mobile devices, for example, in which resources, such as data storage resources, are often relatively limited.

Figures 4, 5:
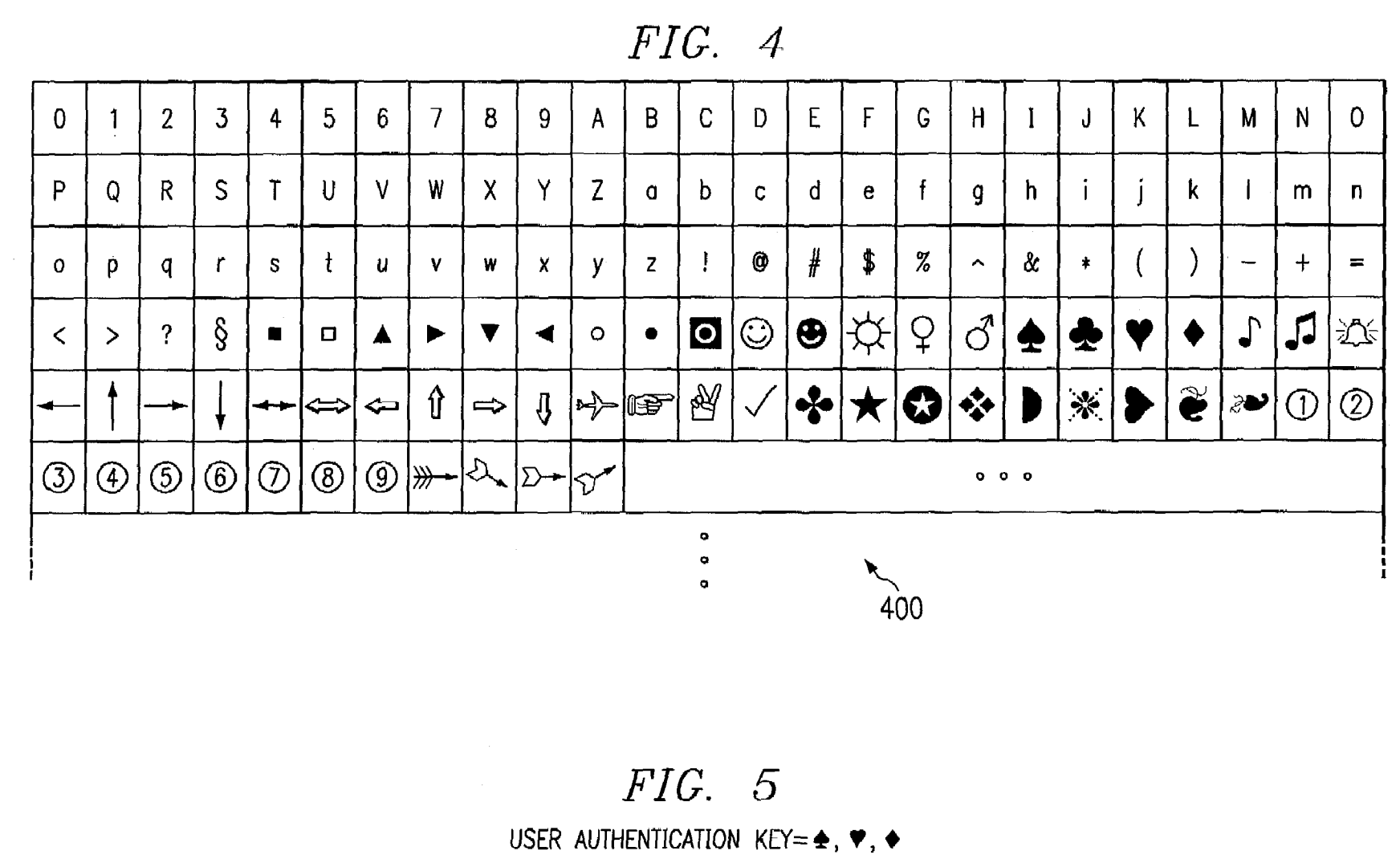

According to one embodiment of the present invention, a relatively large data store (e.g., one or more databases) of objects is provided from which an authenticating key for an authorized user of a device may be selected. An illustration of an example of such a data store 400 is shown in FIG. 4. In this example, data store 400 comprises many objects, including alphanumeric objects, shapes, silhouettes, icons, etc., from which object(s) may be selected to form an authenticating key for a user. Data store 400 may be of any size, but is preferably much larger than the arrangement of objects that is presented to a user during authentication, such as the exemplary arrangements described hereafter in conjunction with FIGS. 6–8. Data store 400 may comprise one or more databases, data structures, or other suitable arrangement of data, and may be stored to any computer-readable medium now known, including as examples random access memory (RAM), hard drive, optical disc, floppy disk, smart card, etc., or such medium later developed.

In one implementation, data store 400 is stored to a device for which a user authentication technique in accordance with an embodiment of the present invention is utilized to restrict access thereto to authorized user(s). In other implementations, data store 400 may be stored to another device or to a data storage device that may be communicatively coupled to the device for which user authentication is desired (e.g., may be stored to an optical disc, floppy disk, smart card, or other removable data storage device now known or later developed). In a preferred embodiment, the device for which user authentication is implemented (and to which data store 400 is stored) comprises a mobile device, such as a mobile computing device and/or communication device.

In a preferred embodiment, the objects of data store 400 from which an authenticating key may be selected are objects that are utilized for at least one other functionality on a device. For instance, as shown in data store 400 of FIG. 4, alphanumeric characters may be included which are not only utilized for authentication of a user, but are also utilized for input/output of such alphanumeric characters in other applications that may execute on the device. Further, shapes, silhouettes, icons, and other objects may be included in data store 400 that are not only utilized for authentication of a user, but are also utilized for input/output of such objects in association with other applications available on the device. As another example, an envelope icon may be included in data store 400, which may also be utilized by an email application to indicate that an unread email message is available on the device. As still a further example, an icon of a bell may be included in data store 400 (as shown in FIG. 4), which may also be utilized by a calendar application to indicate that a reminder alarm is set for an appointment.

Accordingly, in a preferred embodiment, the user authentication system requires no additional storage resources for storing objects that are utilized only for user authentication, as the objects used for such user authentication are objects that are stored to the device for other purposes as well (e.g., for use with applications other than the user authentication application). Such efficient utilization of system resources is often desirable in devices, such as mobile devices, (as well as in room-access systems) in which system resources, such as data storage, are relatively limited. Thus, a preferred embodiment is particularly suited for application within a mobile device. Of course, in alternative embodiments, objects may be included in data store 400 that are utilized only in conjunction with the user authentication application.

An authenticating key comprising one or more objects selected from data store 400 is assigned to a particular user. In certain implementations, a third party, such as a system administrator, the manufacturer of a device, or the authentication application itself, may select one or more objects from data store 400 to form a user's authenticating key. In other implementations, a user may be allowed to select one or more objects from data store 400 to form his/her authenticating key. For instance, upon the initial set-up of the user authentication application for a particular user, the user may be presented an interface that allows the user to peruse the objects available in data store 400 and select those to form his/her authenticating key.

An example of an authenticating key that may be assigned to a user is illustrated in FIG. 5. As shown, the exemplary authenticating key of FIG. 5 comprises three authenticating objects selected from data store 400 (i.e., a spade, heart, and diamond). Any number of objects may be used to form a user's authenticating key, and therefore the present invention is not intended to be limited to the exemplary authenticating key comprising three objects. The user may select objects that have a special meaning to the user and/or are easily remembered by the user. As another example of an authenticating key that a user may select from data store 400, a music lover may select the objects "I ♥ ♫". Also, in certain implementations, an object may be used multiple times in forming a user's authenticating key. For example, a user's authenticating key may be formed by the objects "♥♥♠", wherein the heart object is utilized multiple times in forming the authenticating key. The exemplary authenticating key of FIG. 5 is used hereafter in examples of the operation of embodiments of the present invention.

Figures 6, 7, 8:
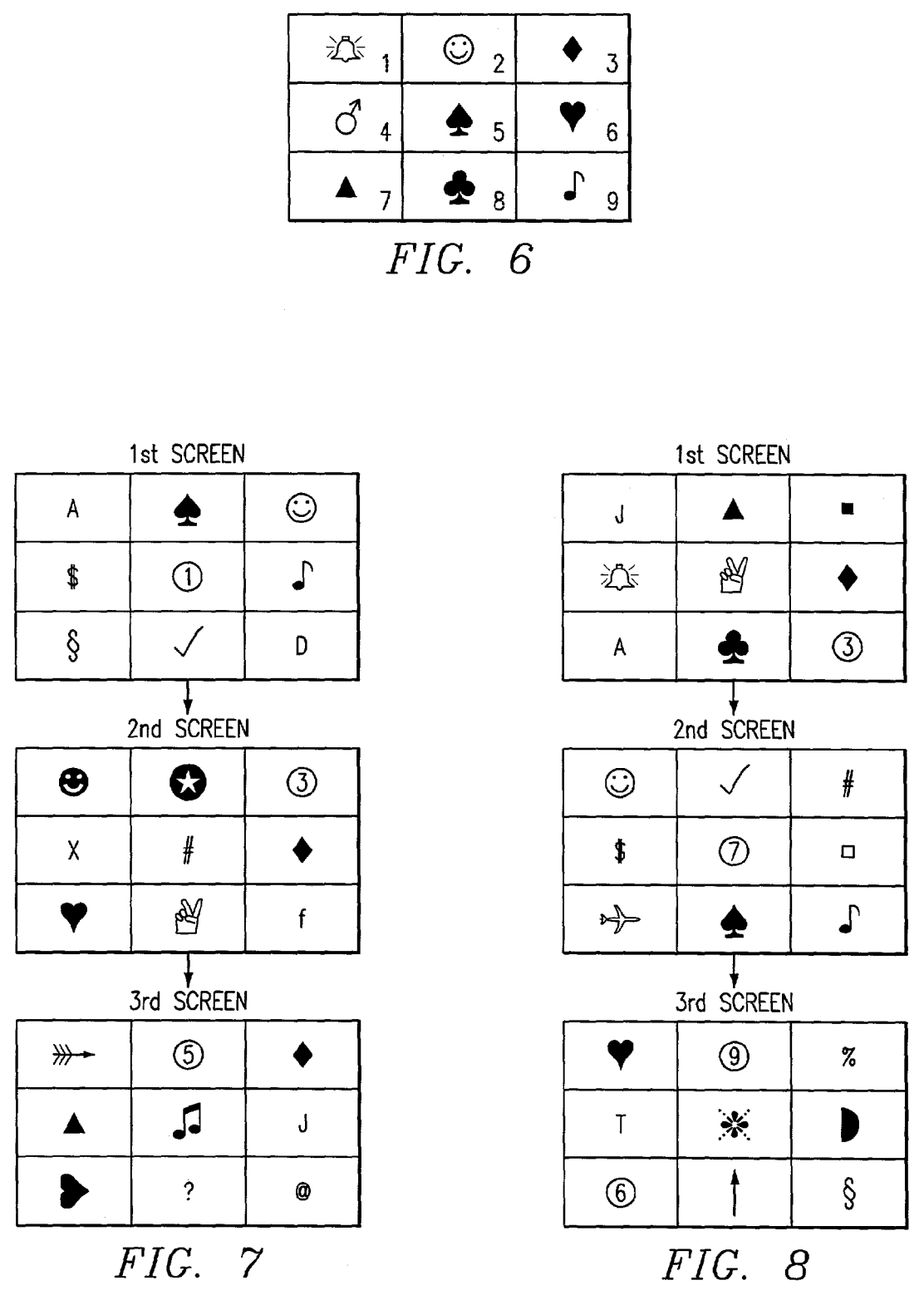

In operation, when authenticating a user, an arrangement of objects are presented to the user. The objects included in the arrangement may be selected from data store 400, and preferably include non-authenticating objects, as well as the authenticating objects that form a user's authenticating key. FIG. 6 shows an exemplary arrangement of objects selected from data store 400. The arrangement of FIG. 6 is a 3 by 3 matrix of objects that may be displayed to the user. In the exemplary embodiment shown in FIG. 6, the objects that form the user's authenticating key (i.e., spade, heart, and diamond) are randomly positioned within the 3 by 3 matrix, and non-authenticating objects that are randomly-selected from data store 400 are also included in the 3 by 3 matrix.

During a first user authentication session the user selects objects from the presented arrangement in an attempt to be authenticated. The selection of the presented objects may be made in any suitable manner, including without limitation the user clicking on the selected objects (e.g., via a mouse, trackball, stylus, or other pointing device) or a user inputting a character (e.g., a number in this example) associated with a selected object. If the user selects the authenticating objects that form his/her authenticating key (i.e., spade, heart, and diamond in this example), then the user is authenticated. Otherwise, the user is not authenticated. The sequence in which the authenticating are selected may be of importance in certain implementations. That is, for the user to be authenticated, the authentication system may require that the user select the authenticating objects (i.e., spade, heart, and diamond in this example) in a specific order, such as: 1) spade, 2) heart, and 3) diamond. For example, the authenticating objects for a user (i.e., spade, heart, and diamond in this example) may be presented in a common arrangement that is displayed on a screen, which also includes one or more non-authenticating objects, such as the arrangement of FIG. 6. For each user authentication session, the authenticating objects may be randomly positioned in the arrangement (e.g., matrix), and non-authenticating objects included in such authentication session may be randomly selected from data store 400. If the user selects the authenticating objects in the correct order from the arrangement, then the user is authenticated. As another example, the authenticating objects may be included in different arrangements that are presented in series on a display, such as in the example of FIG. 7 described below. In other implementations, the specific order in which the authenticating objects are selected may be irrelevant for authenticating a user. For instance, in certain implementations, the user may select spade, heart, and diamond in any order to be authenticated.

Preferably, the objects presented in the arrangement remain constant during a given user authentication session. As used herein, a "user authentication session" refers to the period from presentation of the arrangement to successful authentication of a user. Thus, for example, a user may be allowed multiple opportunities to select the correct authenticating key during a given session. For instance, in the above example, if the user fails in his first authentication attempt during the first session to select the appropriate authenticating objects (i.e., spade, heart, diamond), the authentication system may inform the user of such failure and allow the user another attempt during the first session. Preferably, the objects presented remain constant during the first user authentication session. For instance, if the non-authenticating objects were again randomly-selected from data store 400 after a failed authentication attempt by a user, a user may identify certain objects that are again presented for a second authentication attempt as potentially being the authenticating objects. Thus, in a preferred embodiment, the non-authenticating objects presented in an arrangement may be randomly-selected from data store 400 for each user authentication session, but preferably remain constant during a given session.

After a user has successfully selected the appropriate objects to be authenticated (e.g., spade, heart, and diamond in this example), the user is authenticated. For a subsequent user authentication session the authenticating objects may again be randomly positioned within the arrangement, and non-authenticating objects may again be randomly-selected from data store 400 to be included in the arrangement, thus potentially generating a different arrangement to be presented to the user than the exemplary arrangement of FIG. 6 presented in the first authentication session. As described above, by randomly positioning the authenticating object(s)

in an arrangement presented to the user, a preferred embodiment provides a user authentication system and method that presents difficulty in a casual observer recognizing a user's authentication key by recognizing the position(s) of the arrangement selected by a user during an authentication session (as such authenticating objects may be positioned differently during another authentication session). Further, by randomly selecting the non-authenticating object(s) to be included in an arrangement presented to the user, a preferred embodiment provides a user authentication system and method that presents difficulty in a casual observer recognizing non-authenticating objects that are not selected by a user during an authentication session (for purposes of eliminating such non-authenticating objects in attempting to decipher the user's authentication key) because different non-authenticating objects may be presented in a subsequent authentication session.

In certain implementations, the arrangement may comprise a plurality of matrices that are presented on a plurality of different screens (e.g., with one object of the authenticating key being included within each matrix). For example, FIG. 7 shows an exemplary arrangement that comprises three matrices that are each 3 by 3, wherein each matrix may be presented on a different screen. Additionally, each matrix may comprise one of the authenticating objects that form the user's authenticating key and eight non-authenticating objects randomly-selected from data store 400. Thus, this example provides for 9×9×9=729 possible combinations of objects that may be selected by a user with only one combination that forms the user's authenticating key. Further, as described above, for a given user authentication session the objects that form the user's authenticating key may be randomly positioned within their respective matrix and each matrix may comprise randomly-selected non-authenticating objects from data store 400.

In operation, the user selects an object from screen 1, and is then presented screen 2. The user selects an object from screen 2, and is presented screen 3. After the user W selects an object from screen 3, the user authentication system determines whether the selected objects correspond to the user's authentication key. FIG. 7 provides an example in which the sequence of selection of objects is important, as the user's authentication key in this example is formed by the objects of FIG. 5 ordered as: 1) spade, 2) heart, and 3) diamond. Thus, objects that may form part of the user's authentication key may be included on certain screens as non-authenticating objects. For instance, a selection of the diamond on screen 2 in the example of FIG. 7 is incorrect, as such selection is not in the correct sequence.

Further, in certain implementations, the arrangement may include one or more screens (e.g., matrices) that are presented to the user during an authentication session that do not include an authenticating object. Rather, the user may be required to recognize that an authenticating object is not present on such screen, and may select any object (or alternatively may select a "skip" or "enter" button, as examples) to advance to the next screen. Such a screen that does not include an authenticating object may, in some implementations, act as a "wild card" screen because any object selected therefrom is treated as a correct response. This may add to the difficulty in a casual observer identifying a user's actual authenticating key. Of course, in other implementations, a user may be required to input a specific response to a screen that does not include any authenticating objects (e.g., by pressing a "skip" or "enter" key). It should be understood that the position in the arrangement in which such a screen having no authenticating objects appears may be randomized such that it may vary for each user authentication session. For instance, in a first user authentication session a screen having no authenticating objects may be randomly generated and positioned after the first screen of the example of FIG. 7, and in a second user authentication session a screen having no authenticating objects may be randomly generated and positioned after the second screen of the example of FIG. 7. Further, the number of such screens that have no authenticating objects to be presented to a user during an authentication session may be randomized. For instance, in a first user authentication session a user may be presented with 3 screens that have no authenticating objects (e.g., "wild card" screens); in a second user authentication session a user may be presented with 1 screen that has no authenticating objects; and in a third user authentication session a user may not be presented with any such screens that fail to include an authenticating object.

FIG. 8 shows another exemplary arrangement that comprises three matrices that are each 3 by 3, wherein each matrix may be presented on a different screen. As with the example of FIG. 7, each matrix comprises one of the authenticating objects that form the user's authenticating key and eight non-authenticating objects randomly-selected from data store 400. Thus, this example also provides for 9×9×9=729 possible combinations of objects that may be selected by a user with only one combination that forms the user's authenticating key. Further, as described above, for a given user authentication session the objects that form the user's authenticating key may be randomly positioned within their respective matrix and each matrix may comprise randomly-selected non-authenticating objects from data store 400.

In operation, the user selects an object from screen 1, and is then presented screen 2. The user selects an object from screen 2, and is presented screen 3. After the user selects an object from screen 3, the user authentication system determines whether the selected objects correspond to the user's authentication key. FIG. 8 provides an example in which the sequence of selection of objects is irrelevant, as the user's authentication key in this example is formed by the objects of FIG. 5 unordered. Thus, objects that may form part of the user's authenticating key may be presented on the screens in any order. In this example, they are presented in the order: 1) diamond, 2) spade, and 3) heart. For a given authentication session, the order of presentation of the objects forming the user's authenticating key may be randomly generated. Thus, the user not only is required to recognize and select the objects that form his/her authenticating key, but is also required to recognize such objects in any order in this exemplary implementation.

Figure 9:
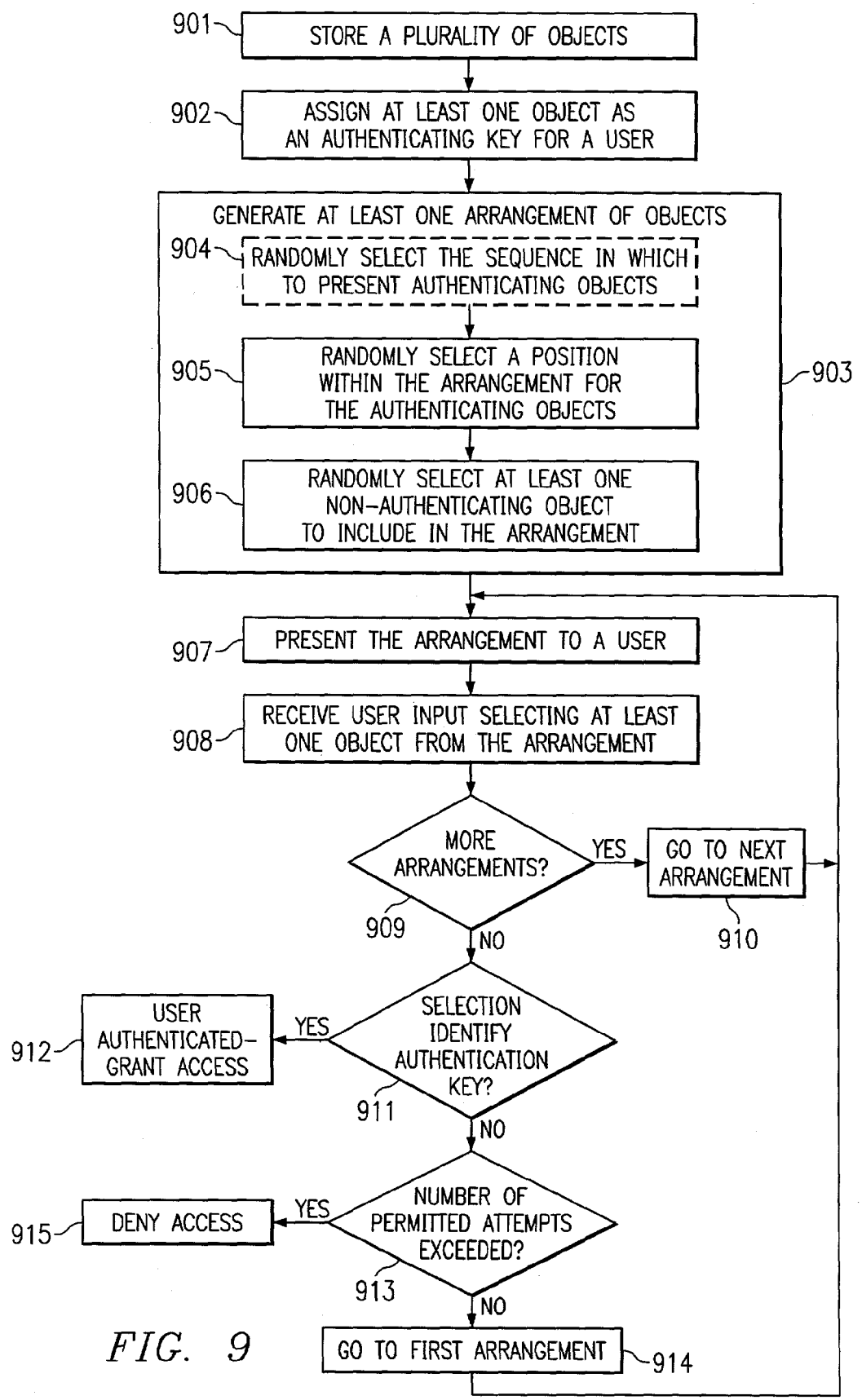
FIG. 9 shows an exemplary operational flow diagram for a preferred embodiment of the present invention.

Turning to FIG. 9, an exemplary operational flow diagram for a preferred embodiment of the present invention is shown. It should be understood that the operations of FIG. 9 may be performed by computer-executable software code, hardware, firmware, or any combination thereof. As shown, in operational block 901 a plurality of objects are stored (e.g., to data store 400 of FIG. 4) from which a user's authentication key may be selected. Preferably, such objects are stored not only for use with the user authentication application but are also utilized for other applications. It should be understood that the storing of such objects (operational block 901) is preferably not part of the authenticating process, but rather, as mentioned below, such storing may be performed as part of an initial set-up process. Additionally, objects may preferably be added to and/or removed from the data store at any time after such initial set-up process. At operational block 902, one or more of the objects are assigned as a user's authenticating key. As described above, such selection of objects to be assigned as a user's authenticating key may be performed by a user or by a third party (e.g., system administrator or the authentication application itself). It should be understood that such assignment process (of operational block 902) is preferably not part of the authenticating process, but rather, as mentioned below, such assignment may be performed as part of an initial set-up process. Further, preferably the authenticating key assigned to a user may be changed (e.g., by the user or by an appropriate third party) from time to time.

Operational blocks 901 and 902 may be performed for the initial set-up of the authentication application. Thereafter, each user authentication session may begin with operational block 903. In operational block 903, an arrangement of objects is generated. As described above, such an arrangement may, for example, comprise one or more 3 by 3 matrices of objects. Generating an arrangement of objects in block 903 may comprise operational blocks 904, 905, and 906, which are described further hereafter.

As described with the example of FIG. 8, in certain implementations, operational block 904 may be performed to randomly select the sequence in which to present the authenticating objects. That is, in implementations in which the selection of objects forming the user's authenticating key is irrelevant, the sequence in which such objects are presented may be randomly generated. In operational block 905, the authentication application may randomly select a position within the arrangement for the object(s) that form the user's authenticating key. In block 906, one or more non-authenticating objects may be randomly-selected from the data store of objects for inclusion in the arrangement.

Thereafter, the generated arrangement is presented to the user in block 907. As an example, the generated arrangement may be displayed to a user. However, in alternative embodiments, the objects may comprise sounds, for example, rather than images, and the presentation to a user in block 907 may therefore comprise audibly presenting the generated arrangement of sounds to the user (e.g., via speakers of a device). In block 908, the authentication application receives user input selecting at least one object from the arrangement. As described above, in certain implementations a plurality of selections of objects may be received from a user. In block 909, the user authentication application determines whether more arrangements (or more portions of an arrangement) are to be presented to the user. For example, an arrangement may comprise a plurality of matrices (as described above in conjunction with FIGS. 7 and 8). Such plurality of matrices may be considered as being a plurality of different arrangements of objects, or they may be considered as a plurality of portions of one arrangement of objects. If determined that another arrangement (or portion of an arrangement) exists, execution advances to block 910, whereat the authentication application advances to the next arrangement (or portion of an arrangement) and returns to block 907 to present such arrangement (or portion) to the user.

Once it is determined at block 909 that no further arrangements (or portions of an arrangement) exist, then execution of the authentication application advances to block 911 to determine whether the received selection of objects identifies the user's authentication key. If the authentication application determines that the user's selection of objects fails to identify the authentication key, execution advances to block 913, whereat it is determined whether the number of permitted attempts for selecting the authenticating objects is exceeded. For example, the authentication application may maintain a count of the number of attempts made by a user during an authentication session and may allow the user a limited number (e.g., three) of attempts to select the authentication key. If the permitted number of attempts is exceeded, the authentication application may deny access to the user in block 915. For example, the authentication application may effectively lock-down the protected device and display a message to the user notifying the user that he/she has failed the authentication process and must notify an appropriate third party (e.g., system administrator) before a new attempt for access to the protected device will be permitted.

On the other hand, if the number of permitted attempts is not exceeded, execution advances to block 914, whereat the application returns to the first arrangement (or portion of an arrangement) and then returns to block 907 to re-present such first arrangement (or portion) to the user. It should be noted that in this example step 903 of generating an arrangement of objects that includes non-authenticating objects randomly-selected from the data store of objects is preferably not repeated during a given session (e.g., after a failed authentication attempt by a user). Rather, the generated arrangement of objects preferably remains constant during a given authentication session. Once it is determined at block 911 that the user-selected object(s) identify the user's authenticating key, the authentication application determines at block 912 that the user is authenticated and therefore grants whatever access rights that the authenticated user has to the protected device.

While examples have been provided herein implementing objects that are images (e.g., alphanumeric characters, silhouettes, etc.), the present invention is not limited to images. Rather, any suitable type of object may be stored and presented to a user for selection of a user's authentication key from such presentation in accordance with embodiments of the present invention. For instance, various sounds (e.g., chimes, ringer tones, musical clips, etc.) may be stored within data store 400 of FIG. 4. Again, for efficient use of data storage resources, such sounds are preferably sounds that are not solely utilized by the user authentication application but are instead otherwise utilized by applications of a device. One or more sounds may be assigned as a user's authenticating key, and an arrangement of sounds may be presented to a user (e.g., by audibly playing such arrangement of sounds via speakers of a device). The user may select a sound (e.g., by inputting a number associated with the selected sound), and the user authentication application may determine whether the selected sound(s) correspond to those of the user's authentication key.

Also, in certain embodiments, the randomization of selecting non-authenticating objects may be somewhat controlled. For instance, the objects of data store 400 may be categorized into a plurality of different categories, such as alphabetic characters, numeric characters, punctuation characters, and silhouettes. A predetermined number of objects from each category may be randomly-selected from data store 400 as non-authenticating objects to be included in an arrangement to be presented to a user in certain implementations. For example, eight non-authenticating objects may be included in a 3 by 3 matrix with one authenticating object (as in each screen of the examples of FIGS. 7 and 8). The eight non-authenticating objects may comprise two alphabetic characters randomly-selected from data store 400, two numeric characters randomly-selected from data store 400, two punctuation characters randomly-selected from data store 400, and two silhouettes randomly-selected from data store 400. Further, in certain implementations, the number of objects to be selected for each category may be randomized.

Also, in certain implementations, the authentication application may randomly select non-authenticating objects from the same category as an authenticating object that is included in an arrangement. For instance, if the user's authenticating key includes an alphabetic character, a numeric character, and a silhouette, then an arrangement of three different screens may be generated that presents one authenticating object with a plurality of non-authenticating objects on each screen (as with the examples of FIGS. 7 and 8). For the screen that includes the alphabetic character of the authenticating key, a plurality of other alphabetic characters randomly-selected from data store 400 may be included therewith. Similarly, for the screen that includes the numeric character of the authenticating key, a plurality of other numeric characters randomly-selected from data store 400 may be included therewith, and for the screen that includes the silhouette of the authenticating key, a plurality of other silhouettes randomly-selected from data store 400 may be included therewith.

Figure 10A:
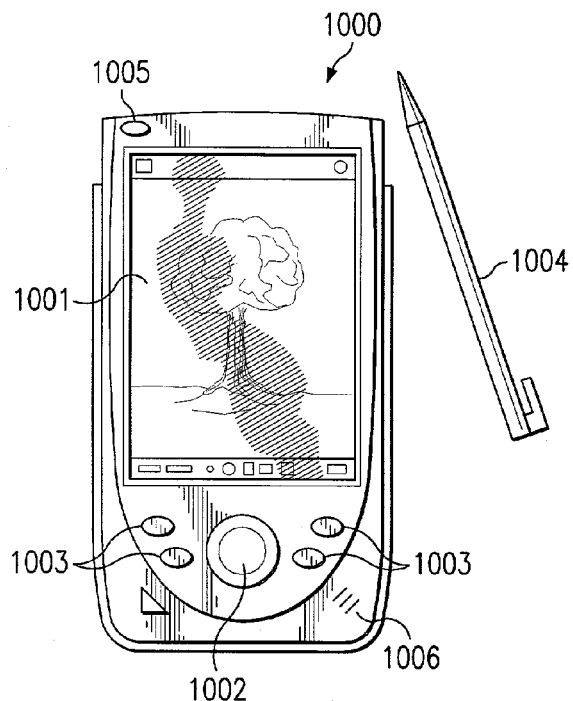
FIGS. 10A–10B illustrate exemplary mobile devices that may implement embodiments of the present invention.
Figure 10B:
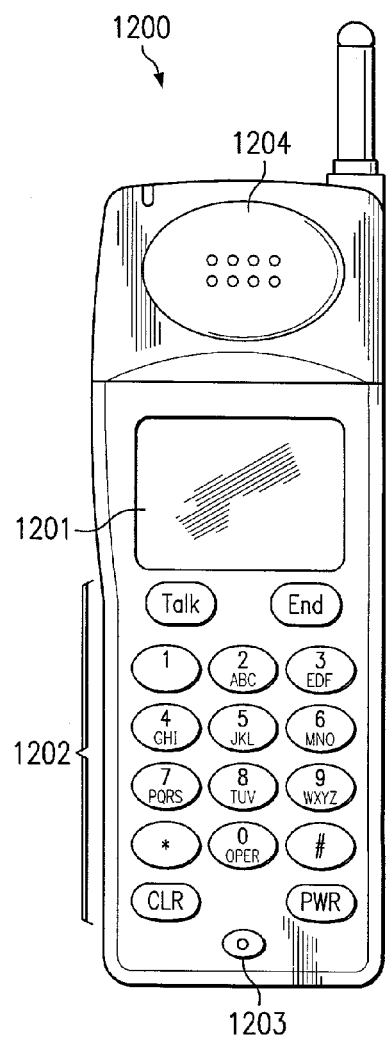

As described above, a preferred embodiment of the present invention is particularly suitable for implementation within a mobile device. FIGS. 10A–10B illustrate exemplary mobile devices that may implement embodiments of the present invention, and FIG. 10C shows an exemplary block diagram depicting an exemplary configuration of a mobile device, such as those illustrated in FIGS. 10A–10B.

FIG. 10A shows an exemplary PDA 1000 that comprises a display 1001 that may, in certain embodiments, present an arrangement of objects to a user as described above. As is well-known in the art, display 1001 may be a touch-screen display that is capable of receiving user input via touching of display 1001 by, for example, stylus 1004. Thus, in certain implementations, a user may select objects for authentication by touching the selected objects on touch-screen display 1001. Additionally, pointing device 1002 (e.g., track pad) may be included to allow for user input, which may in certain implementations be utilized for selection of presented objects for user authentication. Also, input buttons 1003 may be provided that may, in certain implementations, allow for user input for selection of presented objects. Additionally, a microphone 1005 may be provided that is capable of receiving audible commands from a user, which may in certain implementations allow for user input for selection of presented objects. Further, speaker 1006 may be included for presenting audible sounds to a user, which may, in certain implementations, be utilized for presenting an arrangement of audible objects to a user for selection of an authenticating key, as described above.

FIG. 10B shows an exemplary mobile telephone 1200 that comprises a display 1201 that may, in certain embodiments, present an arrangement of objects to a user as described above. In certain implementations, display 1201 may be a touch-screen display that is capable of receiving user input via touching of display 1201 by, for example, stylus 1004 (of FIG. 10A). Thus, in certain implementations, a user may select objects for authentication by touching the selected objects on touch-screen display 1201. Additionally, input buttons 1202 may be provided that, in certain implementations, allow for user input for selection of presented objects. Additionally, a microphone 1203 may be provided that is capable of receiving audible commands from a user, which may in certain implementations allow for user input for selection of presented objects. Further, speaker 1204 may be included for presenting audible sounds to a user, which may, in certain implementations, be utilized for presenting an arrangement of audible objects to a user for selection of an authenticating key, as described above.

Figure 10C:
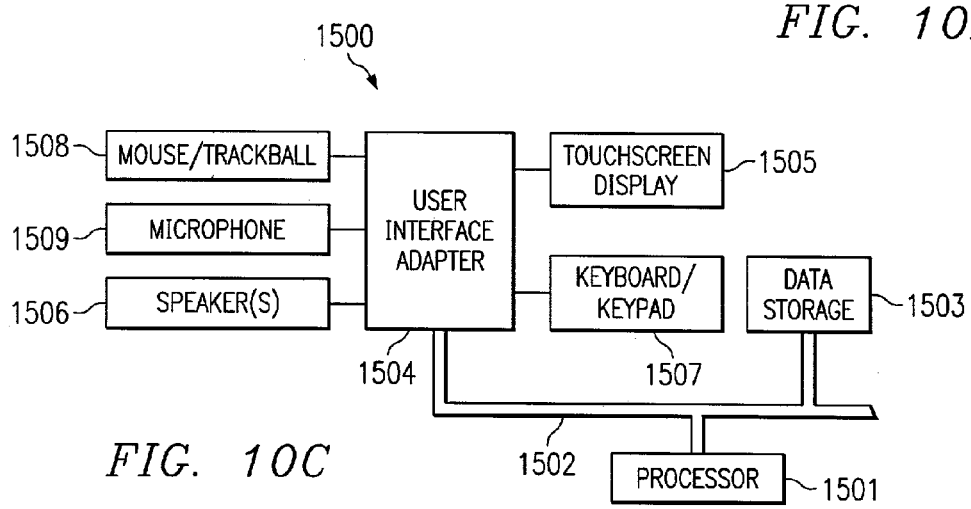
FIG. 10C shows an exemplary block diagram depicting an exemplary configuration of a mobile device, such as those illustrated in FIGS. 10A–10B.

FIG. 10C shows an exemplary configuration 1500 of a mobile device, such as devices 1000 (of FIG. 10A) and/or 1200 (of FIG. 10B) described above, implementing embodiments of the present invention. Processor 1501 may be provided, which may be communicatively coupled to other components of configuration 1500 via communication bus 1502. Processor 1501 may comprise any suitable processor, including without limitation processors commonly implemented in mobile communication devices. However, the present invention is not restricted by the architecture of processor 1501 as long as processor 1501 supports the inventive operations as described herein. Processor 1501 may execute the various logical instructions according to embodiments of the present invention. For example, processor 1501 may execute machine-level instructions for a computer-executable software code implementing user authentication application, such as the instructions according to the exemplary operational flow described above in conjunction with FIG. 9.

Configuration 1500 also preferably includes data storage 1503, which may be random access memory (RAM), for example. Configuration 1500 may utilize data storage 1503 to store the data store (e.g., data store 400) that comprises the various objects for use with a user authentication application, as described above. Further, data storage 1503 may have the computer-executable software code implementing the user authentication application stored thereto.

Configuration 1500 also preferably includes user interface adapter 1504, which may, in certain implementations, enable output of a generated arrangement of objects to a user and enable a user to interact with the mobile device in order to input information for selecting object(s) during the user authentication process. For instance, user interface adapter 1504 may comprise logical instructions or logic elements (e.g., logic gates) which implement the operations necessary to present objects to a user via touch-screen display 1505 of the mobile device or via speaker(s) 1506 of the mobile device, as examples. Further, user interface adapter 1504 may comprise logical instructions or logic elements (e.g., logic gates) which implement the operations necessary to receive user input for selecting one or more objects from the presented arrangement via touch-screen display 1505, keyboard (or input keys) 1507, mouse (or other pointing device) 1508, or microphone 1509 of the mobile device, as examples.

It shall be appreciated that the present invention is not limited to the exemplary architecture 1500 shown in FIG. 10C. For example, any suitable architecture of a processor-based device, such as a mobile device, that is capable of implementing embodiments of the present invention may be utilized. Further, while embodiments of the present invention are particularly suited for use with mobile devices, such as mobile computing and/or communication devices, such embodiments may also be implemented for non-mobile devices and/or for devices utilized for controlling access to a physical location (e.g., room or facility access), and any such implementation is intended to be within the scope of the present invention.

What is claimed is:

1. A method for authenticating a user of a device, said method comprising:
    generating at least one arrangement comprising a sub-set of a plurality of stored objects, said sub-set comprising at least one authenticating object that forms at least part of a user's authentication key and said sub-set further comprising at least one non-authenticating object, wherein said generating comprises randomly selecting a position within said at least one arrangement for said at least one authenticating object and randomly selecting said at least one non-authenticating object from said plurality of stored objects;

presenting to a user said generated at least one arrangement;

receiving input that comprises a selection of at least one of said objects from said at least one arrangement; and determining whether said selection identifies said authentication key.

2. The method of claim 1 further comprising:
denying access to at least a portion of said device if said input is determined not to identify said authentication key.

3. The method of claim 1 wherein said device controls access to a physical location, further comprising:
denying access to said physical location if said input is determined not to identify said authentication key.

4. The method of claim 1 wherein said plurality of stored objects comprises objects that are stored for use on said device for a purpose in addition to authenticating a user.

5. The method of claim 4 wherein said plurality of stored objects comprises objects that are stored for use by an application, other than a user authentication application, executable by said device.

6. The method of claim 1 further comprising:
storing said plurality of objects to a data store that is at least temporarily communicatively accessible by said device.

7. The method of claim 1 further comprising:
storing said plurality of objects to a data store that is at least temporarily communicatively accessible by a mobile device.

8. The method of claim 1 wherein said presenting further comprises:
presenting via a mobile device said generated at least one arrangement.

9. The method of claim 8 wherein said plurality of stored objects are stored to said mobile device.

10. The method of claim 1 wherein said generating, presenting, receiving, and determining are performed by a mobile device.

11. The method of claim 1 wherein said authenticating key comprises a plurality of objects, said generating further comprising:
randomly selecting the sequence in which the plurality of objects of said authenticating key are to be presented.

12. The method of claim 1 further comprising:
assigning each of said plurality of stored objects to at least one of a plurality of different categories.

13. The method of claim 12 wherein said plurality of different categories comprise at least one category selected from the group consisting of: alphabetic, numeric, punctuation marks, icons, and silhouettes.

14. The method of claim 12 wherein said randomly selecting said at least one non-authenticating object from said plurality of stored objects comprises:
randomly selecting said at least one non-authenticating object from a category that corresponds to the category of said at least one object that forms at least part of said authentication key.

15. The method of claim 12 wherein said randomly selecting said at least one non-authenticating object from said plurality of stored objects comprises:
randomly selecting said at least one non-authenticating object from a determined category of said plurality of stored objects.

16. The method of claim 1 further comprising:
assigning at least one of said plurality of stored objects as an authentication key for a user.

17. A system comprising:
means for generating at least one arrangement comprising a sub-set of a plurality of stored objects, said sub-set comprising at least one authenticating object that forms at least part of a user's authentication key and said sub-set further comprising at least one non-authenticating object, wherein said generating means randomly selects a position within said at least one arrangement for said at least one authenticating object and randomly selects said at least one non-authenticating object from said plurality of stored objects;

means for presenting to a user said at least one arrangement;

means for receiving input that comprises a selection of at least one of said objects from said at least one arrangement; and means for determining whether received input is a selection of said authentication key, wherein a user is authenticated if said input is determined to be a selection of said authentication key.

18. The system of claim 17 wherein said system is a mobile system.

19. The system of claim 17 further comprising:
means for assigning each of said plurality of stored objects to at least one of a plurality of different categories, wherein said means for generating at least one arrangement randomly selects said at least one non-authenticating object from a category that corresponds to the category of said at least one authenticating object.

20. The system of claim 17 further comprising:
means for assigning each of said plurality of stored objects to at least one of a plurality of different categories, wherein said means for generating at least one arrangement randomly selects said at least one non-authenticating object from a determined category of said plurality of stored objects.

21. The system of claim 17 further comprising:
means for storing said plurality of objects.

22. A method for authenticating a user of a device, said method comprising:
for a user authentication session, presenting at least one arrangement comprising a sub-set of a plurality of stored objects, said sub-set comprising at least one authenticating object that forms at least part of a user's authentication key and said sub-set further comprising at least one non-authenticating object randomly selected from said plurality of stored objects, wherein said at least one authenticating object is randomly positioned within said at least one arrangement;

receiving input that comprises a selection of at least one of said objects from said at least one arrangement; and determining whether said selection identifies said authentication key.

23. The method of claim 22 wherein said at least one arrangement comprises a matrix.

24. The method of claim 22 wherein said presenting comprises:
presenting a plurality of said arrangements of a sub-set of said plurality of stored objects in series.

25. The method of claim 24 wherein each of said plurality of arrangements comprises at least one authenticating object randomly positioned therein and at least one non-authenticating object randomly selected from said plurality of stored objects.

26. The method of claim 24 wherein said receiving comprises:
for each of said plurality of arrangements, receiving input that comprises a selection of at least one of said objects from such arrangement.

27. The method of claim 26 wherein said determining comprises:
determining whether said selections for said plurality of arrangements identify said authentication key.

28. The method of claim 24 wherein each of said plurality of arrangements comprises a matrix.

29. The method of claim 22 wherein said user's authentication key comprises a plurality of authenticating objects.

30. The method of claim 29 wherein said presenting comprises:
presenting a different one of said plurality of authenticating objects in series.

31. The method of claim 29 wherein said plurality of authenticating objects have a defined order.

32. The method of claim 31 wherein said at least one arrangement may randomly include an authenticating object that is presented out of its defined order and thereby comprise a non-authenticating object of said at least one arrangement.

33. The method of claim 29 wherein said plurality of authenticating objects do not have a defined order.

34. The method of claim 22 wherein said presenting comprises presenting said at least one arrangement on a display of said device.

35. The method of claim 22 wherein said presenting comprises presenting said at least one arrangement on a display of a mobile device.

36. The method of claim 22 further comprising:
presenting at least one arrangement comprising a plurality of objects that does not comprise an authenticating object therein.

37. The method of claim 36 further comprising:
receiving input that comprises a selection of at least one of said objects from said at least one arrangement that does not comprise an authenticating object therein.

38. The method of claim 37 further comprising:
disregarding said input that comprises a selection of at least one of said objects from said at least one arrangement that does not comprise an authenticating object therein.

* * * * *